May 16, 1961  V. J. EVICH  2,984,005

POWER-DRIVEN KNIFE

Filed March 31, 1959

INVENTOR.
VINCENT J. EVICH

BY
ATTORNEY

United States Patent Office 2,984,005
Patented May 16, 1961

2,984,005
POWER-DRIVEN KNIFE
Vincent J. Evich, 1315 Leland St., San Pedro, Calif.
Filed Mar. 31, 1959, Ser. No. 803,173
7 Claims. (Cl. 30—272)

The present invention relates to hand knives and more particularly to a self-contained, hand-held, power-driven knife particularly suitable for use by workmen in cleaning and dressing meat, fish and the like objects and greatly reducing the required effort.

Workmen employed in fish canneries and meat packing establishments have heretofore relied upon the muscular strength and endurance of workmen with hand-powered knives in dressing and cleaning fish, meat and the like objects. This is extremely arduous work. Women are particularly skillful in manipulating knives to perform this work but lack the strength and endurance to work steadily throughout a work day. Proposals have been made heretofore to supplement the strength of workmen by some auxiliary power means. However, these attempts have not been satisfactory for numerous reasons including the involved marked increase in the weight of the knife, the ineffectiveness of such knives as heretofore designed for the use of power, and other reasons well known to those familiar with these endeavors.

By the present invention there is provided a simple, compact, lightweight knife easily held in the hand and adapted to be powered through a flexible shaft extending from the heel of the handgrip to a remotely located driving motor. The flexible shaft is arranged to drive a member bearing against the pivotally supported knife blade in a manner to oscillate the cutting end of the blade through a small arc without permitting movement of the blade in any other direction. In a preferred arrangement the plane of oscillation is normal to the face of the blade, this arrangement being particularly useful when the knife is to be used for scraping, shaving and gouging away imperfections or undesired portions of the meat body. Since the blade is restrained against movement in any other plane, the cutting edge of the blade proper may be used in the usual manner for cutting purposes. Owing to the location of the driving motor at a remote point and separately from the handle, the knife proper has substantially the same feel, weight, and handling characteristics of non-power-driven knives. This characteristic is further enhanced by the flexibility of the power shaft connected to the knife and by the fact that the knife is normally used well within the range of maximum flexibility of the shaft.

Accordingly, it is a primary object of the present invention to provide a hand-held, power-driven knife for use by persons generally, and particularly those employed in the fish and meat packing industries.

Another object of the invention is the provision of a power-driven knife adapted to be held in the hand and having a blade driven through a small arc of oscillation in a predetermined plane and held against movement in all other planes.

Another object of the invention is the provision of a hand-held, power-driven knife assembly, including a hand-held knife detachably coupled through a flexible shaft with a remotely located driving motor.

Another object of the invention is the provision of a hand-held knife having a movably supported blade which is power-actuated to perform a desired cutting operation without need for the application of any substantial manipulating force by the operator.

These and other more specific objects will appear upon reading the following specification and claims and upon considering in connection therewith the attached drawing to which they relate.

Referring now to the drawing in which preferred embodiments of the invention are illustrated:

Figure 1:
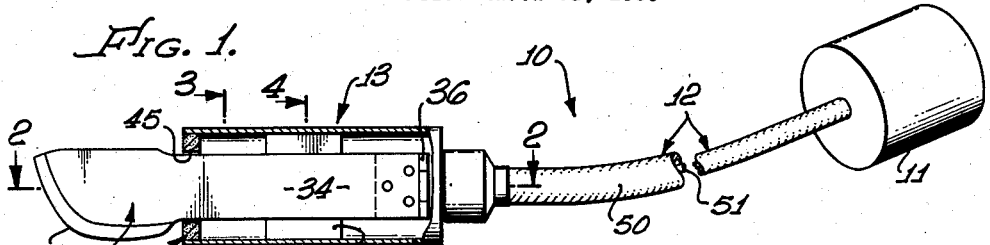
Figure 1 is a view, partly in section, of a unitary power-driven knife incorporating features of the present invention.
Figure 3:
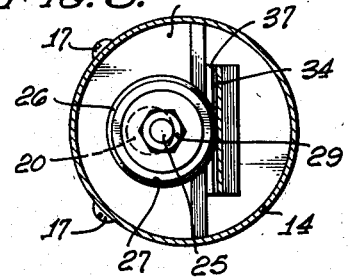
Figure 4:
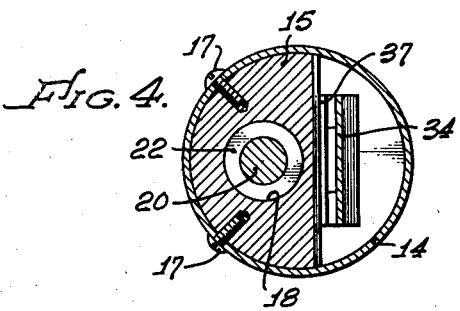
Figure 5:
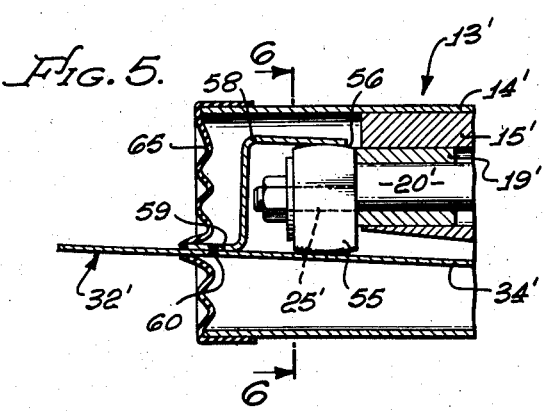
Figure 6:
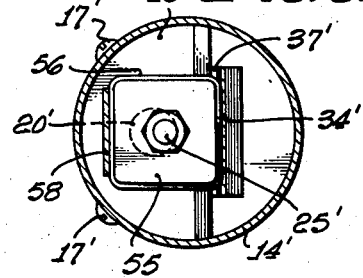

Figures 3 and 4 are cross-sectional views on enlarged scales taken on line 3—3 and 4—4 on Figure 1, respectively;

Figure 5 is a fragmentary sectional view on an enlarged scale of a modified driving connection between the knife blade and the driving shaft of the power unit; and Figure 6 is a cross-sectional view taken on line 6—6 on Figure 5.

Figure 2:
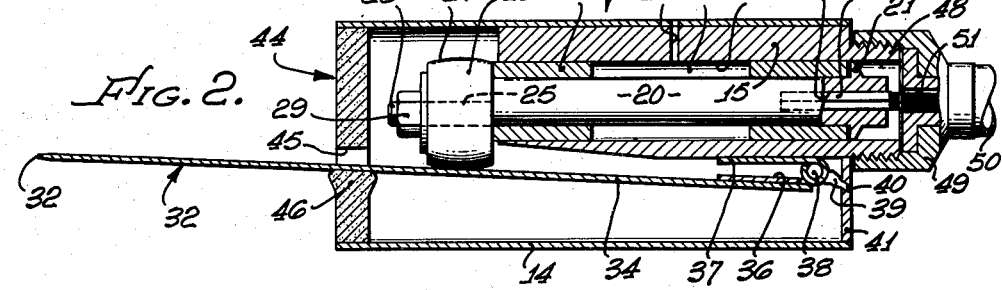
Figure 2 is a longitudinal cross-sectional view on an enlarged scale taken along line 2—2 on Figure 1.

Referring first to Figures 1 to 4 showing one preferred embodiment of the invention, there is shown a unitary power-driven knife designated generally 10 including a driving motor 11, a flexible shaft 12 and a hand-held knife assembly 13. The constructional details of knife assembly 13 are best shown in Figure 2 and include a lightweight handgrip shell 14 of aluminum, stainless steel, or a tough non-breakable plastic material such as nylon. Preferably the exterior surface is knurled or otherwise roughened to provide the operator with a firm grip without need for the application of any particular pressure.

Shell 14 may be separate from or molded integral with a bearing support member 15 fitting snugly against one interior side wall of handgrip 14 and secured in place thereagainst, as by screws 17. Seated at the opposite ends of a bore 18 extending through member 15 are a pair of suitable bearings 19, 19 rotatably supporting a shaft 20 having a collar 21 at one end bearing against the adjacent end of one of bearings 19. The adjacent ends of bearings 19 cooperate with shaft 20 and bore 18 to provide a lubricant reservoir 22 for maintaining a supply of lubricant for the bearings. Filling opening 23 preferably closed by a closure cap, not shown, facilitates replenishing the supply of lubricant in reservoir 22 as required.

A small diameter pin 25 projects from the forward end of shaft 20 and has its axis offset radially a short distance from the axis of shaft 20. Rotatably supported on eccentrically located pin 25 is a thick disc roller 26 having a spherical peripheral surface 27, the purpose of which will become apparent presently. Roller 26 is held assembled on pin 25 in any suitable manner as by threads 28 on the outer end thereof mating snugly with the threads of a nut 29.

The knife blade may have any desired configuration depending upon the work to be performed, a particularly suitable shape for removing undesirable portions of fish fillets being that illustrated in Figures 1 and 2 wherein blade 32 is seen to have a stubby, wide blade provided with a crescent-shaped sharp cutting edge 33 along its lower edge and across its outer end. Blade 32 includes a long shank 34 extending through the forward end of handgrip 14 and having its inner end movably secured to the handgrip structure. A particularly satisfactory connection is provided by a conventional strap hinge 36 having one leaf thereof rigidly secured, as by welding, to the free end of shank 34. The other leaf 37 of the hinge is similarly rigidly fixed to the adjacent side wall of bearing support 15. The leaves of the hinge are pivotally joined by snugly fitting pintle pin 38 which permits free oscillatory movement of the blade in a short path normal to the face of the blade while effectively preventing movement in any other direction. Provision for lubricating the hinge pintle may include wicking 39 bearing against the adjacent area of the hinge and having its outer ends exposed for the reception of lubricant through an opening 40 in end wall 41 of handgrip 14.

The knife blade may be maintained in contact with eccentrically supported roller 26 in any suitable manner as for example by a spring, not shown, but having one end bearing against the blade shank opposite roller 26 and the other end bearing against the interior side wall of handle shell 14. Another expedient makes use of a sponge rubber closure disc 44 suitably secured in the forward end of shell 14. Insert 44 is provided with a slit 45 through which the shank 34 of the knife blade is inserted. This slit is so positioned that the portion of insert 44 directly opposite the end of roller 26 is not compressed by the oscillatory movement of the blade and so that portion 46 of the insert positioned on the other side of shank 34 is very materially compressed when shaft 20 and roller 26 are in one extreme position thereof, as is shown in Figure 2. The resulting compression of portion 46 of the insert is effective in urging and maintaining the shank 34 of the knife blade pressed against roller 26 in all operative positions thereof while allowing the knife blade to be shifted out of contact with the roller when excessive resistance is encountered by the blade and typically by cutting edge 33 thereof.

The readily detachable coupling holding flexible shaft 12 in driving relation to shaft 20 is best shown in Figure 2. To this end, the outer ends of bearing support 15 are provided with a threaded collar 48 mating with the threads of a coupling bushing 49 rotatably held assembled to the external end of a flexible tubular housing 50 for flexible shaft 51. It will be understood that the terminal end 53 of flexible shaft 51 is square or of other non-circular shape having a close telescoping fit within a complementally shaped well 54 extending axially of the outer end of shaft 20. Coupling bushing 49 has a close frictional fit with the threads of collar 48, knurling or other roughening desirably being provided on the exterior of coupling bushing 49 to facilitate assembly and disassembly of the motor and flexible shaft 12 with respect to the knife unit 13.

Referring now to Figures 5 and 6, there is shown a second embodiment of the knife differing from the first described embodiment in the construction of the driving connection between the driving shaft and the knife blade. It will be understood that the same reference characters have been used in describing the same or similar parts of the two embodiments, those used in Figures 5 and 6 being distinguished by the addition of a prime. Roller 26, as used in the form shown in Figures 1 to 4, is here replaced by a follower member 55 having a central bore therein fitting freely over drive pin 25' supported in the end of shaft 20' in the same manner as in Figures 1 to 4. The exterior periphery 56 of follower 55 is generally square in outline or of other non-circular shape but each of its peripheral surfaces is preferably beveled or spherically contoured crosswise thereof similarly to surface 27 of roller 26. A cooperating follower 58 of generally L-shape has an out-turned end 59 spot welded or otherwise secured to shank 34' of knife blade 32', as is indicated at 60. It is pointed out that follower member 58 cooperates with the knife shank 34' to constrain the knife blade to oscillate to and fro through a limited path determined by the eccentricity of pin 25' with respect to the axis of shaft 20'.

A further variation from the preferred embodiment is the use of a fluid-tight flexible boot 65 of rubber or the like enclosing the forward end of knife handle 14'. This boot fits snugly and in a fluid-tight manner about the end of handle 14' and about the junction of the knife blade with its shank 34 in the manner made clear by Figure 5. The intermediate portions of boot 65 are preferably corrugated or otherwise shaped to avoid interfering with the oscillatory movement of the blade while preventing foreign matter or fluids from entering the interior of the knife handle.

In use, the operator grasps the handgrip 14 of the knife in the usual manner and manipulates the blade to bring its cutting edge 33 into shaving contact with the surfaces to be scraped or otherwise removed, moving the cutting edge inwardly to the depth desired to effect removal of objectionable portions of the meat. The application of no appreciable pressure is required since the to-and-fro movement of the rapidly oscillating blade crosswise of its edge effects simultaneous shaving and penetration of the blade into the meat without noticeable effort on the part of the operator other than that required to guide and support the knife to effect the results desired. In scraping away scales and skin from fish or in removing layers of fatty or objectionable tissue, the operator simply moves the cutting edge of the knife transversely of the surface being dressed and to the desired depth.

It is found desirable to oscillate the blade at varying speeds depending upon the nature of the surface being dressed, speeds of oscillation ranging between 1800 and 3600 per minute being found particularly suitable. If it is desired to use the knife for cutting, this may be done most effectively without discontinuing the operation of the motor, it merely being necessary to use a faster than normal cutting stroke lengthwise of the knife blade. The oscillations imparted to the blade greatly facilitate the cutting action without chafing or shredding the meat because of the very rapid execution of the cutting stroke. At other times, it may be desired to use the knife for cutting without oscillating the blade. In these circumstances, it is merely necessary to stop the motor by pressing a suitable motor control switch operable by the operator's knee, foot or by his left hand.

Although both of the illustrated embodiments of the knife are effective to oscillate the blade crosswise of its cutting edge, it will be understood that the design may be readily modified to the slight extent necessary to oscillate the blade within the plane of its cutting edge. To this end, it is merely necessary to change the hinge axis to lie crosswise of the plane of the blade and to arrange roller 26 to bear against one edge of the blade shank. These changes are so obviously within the skill of an ordinary mechanic as not to require separate illustration. However, it is to be understood that these and the like structural modification fall within the scope and the principles of the present invention as herein proposed and claimed. It will also be understood the blade can be reciprocated in the plane thereof by arranging the eccentric roller to bear against the end of the shank or to operate in an elongated opening extending croswise of the shank in such fashion as to reciprocate the blade lengthwise thereof.

While the particular power-driven knife herein shown and disclosed in detail is fully capable of attaining the objects and providing the advantages hereinbefore stated, it is to be understood that it is merely illustrative of the presently prefered embodiments of the invention and that no limitations are intended to the details of construction or design herein shown other than as defined in the appended claims.

I claim:

1. A power-driven hand-held scraping knife comprising, a handgrip, a knife blade extending axially from one end of said handgrip and having a shank end aligned with said blade and enclosed by said handgrip, means movably supporting said blade and shank on an axis located within said handgrip, and power-driven means within said handgrip operatively connected with said blade for moving the same rapidly and repeatedly through a short stroke about an axis lying substantially in the plane of said blade in all operating positions thereof.

2. A power-driven scraping knife assembly adapted to be driven through a flexible shaft from a remotely positioned electric motor said assembly comprising a hand-held knife unit, said knife unit including a generally tubular handgrip, a knife blade having a supporting shank extending from one end thereof into one end of said handgrip, means movably supporting the shank end of said blade within said handgrip, and means for operatively interconnecting said blade and the terminal end of said flexible shaft at a point within said handgrip to oscillate said blade through an arc generally normal to the plane of said knife blade when said motor is energized.

3. A power-driven knife as defined in claim 2 characterized in the provision of a flexible walled fluid-tight boot embracing said knife blade adjacent the root portion of its shank and the adjacent end of said handgrip to form a flexible closure for the handgrip without impeding the free oscillation of said blade.

4. A power-driven knife as defined in claim 2 characterized in that said means operatively connecting said flexible shaft and said knife blade includes an eccentric driven by said shaft with its peripheral surface bearing against the face of said shank, and means effective to hold said blade shank against the said surface of said eccentric.

5. A power-driven hand-held meat dressing knife, comprising a tubular handgrip, a knife blade extending from one end of said handgrip having a shank hingedly connected at its free end with the interior of said handgrip, said hinge connection permitting said blade to pivot freely through a limited arc normal to the face of said blade and rigidly supporting the blade against movement in any other plane, and means enclosed by said handgrip and operatively connected to said blade to oscillate the same within said limited arc when said last means is activated from a power source external to said handgrip and to which said handgrip is adapted to be connected.

6. A knife as defined in claim 5 characterized in that said means for oscillating said knife blade comprises a disc having a spherically surfaced peripheral surface, means fixedly securing said disc eccentrically to the end of a shaft journalled within said handgrip lengthwise thereof and to one side of said blade shank, and means for holding one side wall of said blade shank, against the spherical surface of said eccentrically supported disc as said shaft rotates.

7. A hand-held power-driven knife suitable for use in de-scaling fish, dressing meat, removing excess fat from meat and the like, said knife having a handgrip rotatably supporting lengthwise therewithin a shaft, a pair of bearings adajcent the opposite ends of said shaft, a lubricant reservoir between said bearings adapted to be replenished from the exterior of said handgrip, a knife blade having a shank extending into one end of said handgrip and lying to one side of said shaft, hinge means connecting the inner end of said shank to said handgrip, eccentrically mounted roller means journalled to one end of said shaft with its surface bearing against said knife shank, and means for holding said shank in contact with said roller.

References Cited in the file of this patent

UNITED STATES PATENTS

| 2,161,335 | Cherry | June 6, 1939 |
| 2,168,703 | Dziedzic et al. | Aug. 8, 1939 |
| 2,503,539 | Aspeek | Apr. 11, 1950 |
| 2,722,072 | Aspeek | Nov. 1, 1955 |

FOREIGN PATENTS

| 478,354 | Germany | June 24, 1929 |
| 753,902 | France | Aug. 21, 1933 |
| 1,018,317 | France | Oct. 15, 1952 |